D. GILBERT.
Shovel-Plow.

No. 66,144. Patented June 25, 1867.

Witnesses:
Theo Insche
J. A. Service

Inventor:
Daniel Gilbert
Per Munn & Co.
Attorneys

United States Patent Office.

DANIEL GILBERT, OF CARBONDALE, ILLINOIS.

Letters Patent No. 66,144, dated June 25, 1867.

---

SHOVEL-PLOUGH.

---

*The Schedule referred to in these Letters Patent and making part of the same.*

---

TO ALL WHOM IT MAY CONCERN:

Be it known that I, DANIEL GILBERT, of Carbondale, in the county of Jackson, and State of Illinois, have invented a new and useful improvement in Shovel-Ploughs; and I do hereby declare that the following is a full, clear, and exact description thereof, which will enable others skilled in the art to make and use the same, reference being had to the accompanying drawings, forming part of this specification, in which—

Similar letters of reference indicate like parts.

My invention has for its object to so improve the construction of shovel-ploughs as to increase their strength and steadiness in working, and so as to adapt them to all kinds of work; and it consists in forming a groove or notch in the upper part of the rear side of the plough-plate for the reception of the supporting-frame; and in the combination and arrangement of the inclined bar with the horizontal and upright bars of the iron frame; the whole being constructed and arranged as hereinafter more fully described.

Figure 1:
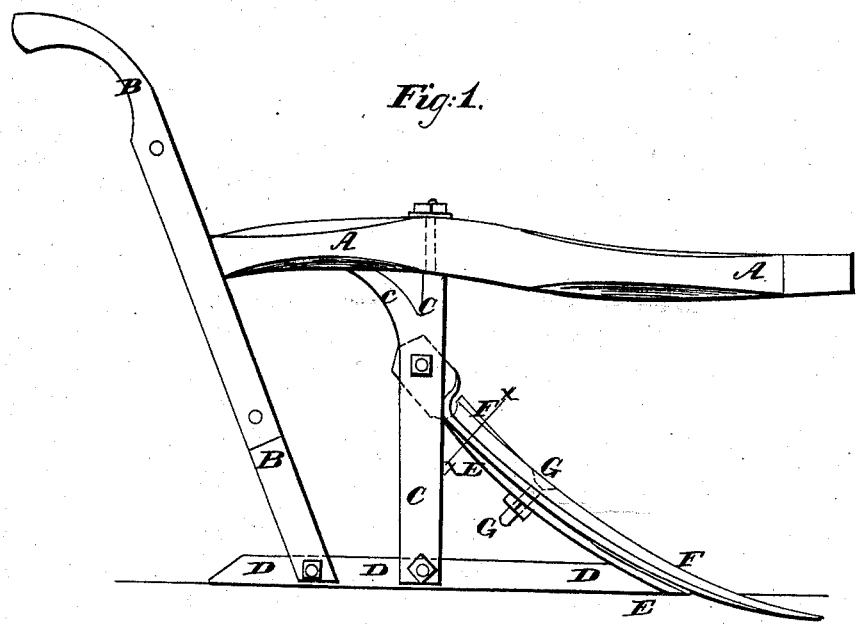
Figure 1 is a side view of my improved shovel-plough.
Figure 2:
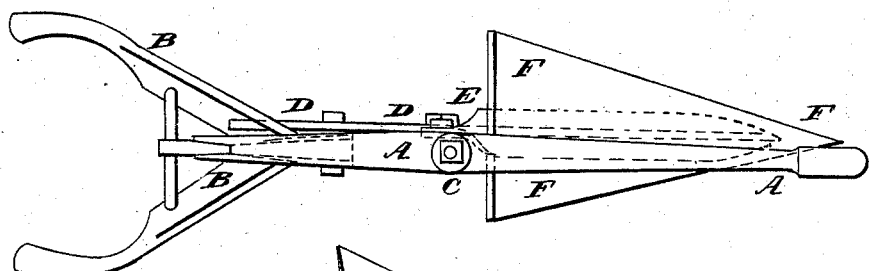
Figure 2 is a top view of the same.
Figure 3:
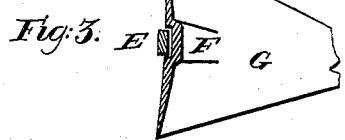
Figure 3 is a detail cross-section taken through the line $x\,x$, fig. 1.

A is the beam, and B are the handles of the plough, about the construction of which parts there is nothing new. C is the upright, the upper end of which is secured to the beam A, and which is further strengthened by the inclined or brace part, $c'$. The lower end of the upright C is securely bolted to the horizontal bar D, as shown in fig. 1. To the rear end of the horizontal or ground bar D is securely bolted the lower ends of the plough-handles B, and to its forward end is welded, or otherwise firmly attached, the lower end of the inclined bar E. The upper end of the inclined supporting-bar E is bolted to the upright C, as shown in fig. 2. The upper edge or side of the bar E, upon which the ploughshare or shovel-plate, F, rests, is made slightly curved, so as to fit the curve of the shovel-plate F. The shovel-plate F is made with a groove or notch in the under side of its upper part to fit upon the bar E, so as to give to the said plate a firm and stable seat. The plate F is secured to the bar E by a bolt, G, passing through the middle part of the said plate, and through the bar E, as shown in the drawings. This construction of the plate F and frame C D E enables the plough to resist any force or strain short of such as would break the plough-plate. It also renders it steady in working, and adapts it to all kinds of work, since, by the removal of the bolt G the plough-plate may be readily changed for another of any desired shape or size. If desired, a coulter may be added to the plough, which renders it very effective for breaking up new ground, especially timber ground.

What I claim as new, and desire to secure by Letters Patent, is—

1. Forming the shovel or plough-plate F with a groove or notch in the under side of its upper part to fit upon the bar E, substantially as herein shown and described, and for the purpose set forth.

2. The combination and arrangement of the bar E with the upright C, and horizontal or ground bar D, substantially as herein shown and described, and for the purpose set forth.

DANIEL GILBERT.

Witnesses:
JONATHAN BRICKER,
ELIJAH D. ANKNEY.